(12) United States Patent
Srinivasan

(10) Patent No.: US 9,838,413 B2
(45) Date of Patent: Dec. 5, 2017

(54) ZERO DAY THREAT DETECTION BASED ON FAST FLUX DETECTION AND AGGREGATION

(71) Applicant: Subbu Srinivasan, Milpitas, CA (US)

(72) Inventor: Subbu Srinivasan, Milpitas, CA (US)

(73) Assignee: Zscaler, Inc., San Jose, CA (US)

( * ) Notice: Subject to any disclaimer, the term of this patent is extended or adjusted under 35 U.S.C. 154(b) by 0 days.

(21) Appl. No.: 15/145,044

(22) Filed: May 3, 2016

(65) Prior Publication Data
US 2016/0261625 A1 Sep. 8, 2016

Related U.S. Application Data

(63) Continuation of application No. 14/446,836, filed on Jul. 30, 2014, now Pat. No. 9,363,269.

(51) Int. Cl.
*H04L 29/06* (2006.01)
*H04L 12/733* (2013.01)
*H04L 29/12* (2006.01)

(52) U.S. Cl.
CPC .......... *H04L 63/1433* (2013.01); *H04L 45/20* (2013.01); *H04L 61/1511* (2013.01); *H04L 63/10* (2013.01); *H04L 63/145* (2013.01); *H04L 63/1425* (2013.01); *H04L 63/1441* (2013.01)

(58) Field of Classification Search
CPC . H04L 63/1433; H04L 63/10; H04L 63/1425; H04L 63/1411; H04L 63/145; H04L 45/20; H04L 61/1511; H04L 63/1441
See application file for complete search history.

(56) References Cited

U.S. PATENT DOCUMENTS

| | | | |
|---|---|---|---|
| 8,205,258 B1* | 6/2012 | Chang | G06F 17/30684 709/217 |
| 8,539,577 B1* | 9/2013 | Stewart | H04L 29/12066 726/22 |
| 8,561,188 B1 | 10/2013 | Wang | |
| 8,762,298 B1 | 6/2014 | Ranjan | |
| 9,363,282 B1* | 6/2016 | Yu | H04L 63/1425 |
| 2010/0235915 A1 | 9/2010 | Memon | |
| 2012/0054869 A1* | 3/2012 | Yen | H04L 29/12066 726/24 |
| 2014/0173731 A1 | 6/2014 | Mantripragada | |

(Continued)

*Primary Examiner* — Sarah Su
(74) *Attorney, Agent, or Firm* — Clements Bernard Walker PLLC; Lawrence A. Baratta, Jr.

(57) ABSTRACT

A method in a cloud-based security system includes operating a Domain Name System (DNS) resolution service, proxy, or monitor in the cloud-based security system; receiving DNS records with time-to-live (TTL) parameters; checking the TTL parameters for indication of a fast flux technique; and detecting domains performing the fast flux technique based on the DNS records. A cloud-based security system includes a plurality of nodes communicatively coupled to one or more users; and a Domain Name System (DNS) service providing a resolution service, proxy, or monitor in the cloud-based security system; wherein the DNS service is configured to receive DNS records with time-to-live (TTL) parameters; check the TTL parameters for indication of a fast flux technique; and detect domains performing the fast flux technique based on the DNS records.

20 Claims, 10 Drawing Sheets

(56) References Cited

U.S. PATENT DOCUMENTS

2015/0082431 A1* 3/2015 Davis .................. H04L 63/1425
　　　　　　　　　　　　　　　　　　　　726/23
2015/0143504 A1　　5/2015 Desai
2015/0195299 A1　　7/2015 Zoldi
2016/0294773 A1* 10/2016 Yu ....................... H04L 63/1425

\* cited by examiner

ZERO DAY THREAT DETECTION BASED ON FAST FLUX DETECTION AND AGGREGATION

CROSS-REFERENCE TO RELATED APPLICATION(S)

This patent application/patent is a continuation of co-pending U.S. patent application Ser. No. 14/446,836 filed Jul. 30, 2014, and entitled "ZERO DAY THREAT DETECTION BASED ON FAST FLUX DETECTION AND AGGREGATION," the contents of which are incorporated in full by reference herein.

FIELD OF THE DISCLOSURE

The present disclosure relates generally to computer networking systems and methods. More particularly, the present disclosure relates to Zero Day Threat Detection based on Fast Flux detection and aggregation.

BACKGROUND OF THE DISCLOSURE

Zero day threat detection/prevention of cyber-attacks is a difficult task to accomplish given the wide variety of threat vectors that need to be addressed. A zero day (or zero hour or day zero) attack or threat is an attack that exploits a previously unknown vulnerability in a computer application, one that developers have not had time to address and patch. Different approaches like firewall, client side agents, sand boxing, Uniform Resource Locator (URL)/domain based classification are utilized to detect/prevent cyber-attacks. URL/domain classification is a key mechanism to detect that a particular system has been infected, this works by comparing the domain name in the resource requested against a black list of domains and then performing an appropriate policy related action on that resource request. There are three weak links in this chain, the first being the URL/domain classification system, the state of which can get out of synchronization quickly with the real snap shot of the Internet giving the distributed nature of the network. Secondly, these changes need to be propagated to the upfront systems that feed off this classification and, thirdly, the classification system could completely misclassify a particular domain. The combination of the above can result in a window of opportunity for a cyber-security event like phishing, spam etc.

Fast flux is an advanced technique used to carry out sophisticated attacks like distributed denial-of-service (DDOS), phishing, malware distribution, etc. Fast flux is a Domain Name System (DNS) technique used by botnets, etc. to hide phishing and malware delivery sites behind an ever-changing network of compromised hosts acting as proxies. It can also refer to the combination of peer-to-peer networking, distributed command and control, web-based load balancing and proxy redirection used to make malware networks more resistant to discovery and counter-measures. The basic idea behind Fast flux is to have numerous Internet Protocol (IP) addresses associated with a single fully qualified domain name, where the IP addresses are swapped in and out with extremely high frequency, through changing DNS records. The simplest type of fast flux, named "single-flux", is characterized by multiple individual nodes within the network registering and de-registering their addresses as part of the DNS A (address) record list for a single DNS name. This combines round robin DNS with very short—usually less than five minutes (300 s) TTL (time to live) values to create a constantly changing list of destination addresses for that single DNS name. The list can be hundreds or thousands of entries long. A more sophisticated type of fast flux, referred to itself as "double-flux," is characterized by multiple nodes within the network registering and de-registering their addresses as part of the DNS Name Server record list for the DNS zone. This provides an additional layer of redundancy and survivability within the malware network.

Within a malware attack, the DNS records will normally point to a compromised system that will act as a proxy server. This method prevents some of the traditionally best defense mechanisms from working—e.g., IP-based access control lists (ACLs). The method can also mask the systems of attackers, which will exploit the network through a series of proxies and make it much more difficult to identify the attackers' network. The record will normally point to an IP where bots go for registration, to receive instructions, or to activate attacks. Because the IPs are proxified, it is possible to disguise the originating source of these instructions, increasing the survival rate as IP-based block lists are put in place. More details about fast flux are available at www.honeynet.org/book/export/html/130.

BRIEF SUMMARY OF THE DISCLOSURE

In an exemplary embodiment, a method in a cloud-based security system includes operating a Domain Name System (DNS) resolution service, proxy, or monitor in the cloud-based security system; receiving DNS records with time-to-live (TTL) parameters; checking the TTL parameters for indication of a fast flux technique; and detecting domains performing the fast flux technique based on the DNS records The detecting can be based on the cloud-based security system having a large, distributed view of ongoing network activity and monitoring and analyzing extremely short TTLs and behavior over time based on the DNS records. The method in a cloud-based security system can further include performing DNS queries for one or more users of the cloud-based security system; receiving the DNS records responsive to the DNS queries; and caching the DNS records locally until expiration per the TTL parameters responsive to not detecting the fast flux technique. The receiving the DNS records can be responsive to operating a tap mode in the cloud-based security system.

The method in a cloud-based security system can further include performing DNS queries for one or more users of the cloud-based security system and operating in a tap mode DNS requests not being performed for the one or more users. The method in a cloud-based security system can further include propagating the detected domains to various nodes in the cloud-based security system for blacklisting. The method in a cloud-based security system can further include receiving data requests from a plurality of users of the cloud-based security system; and processing the data requests to detect security threats including checking associated domains for the data requests for the detected domains. The security threats can be any of malware, spyware, viruses, email spam, and data leakage. The method in a cloud-based security system can further include blocking the data requests if an associated domain is on a blacklist including the detected domains.

The method in a cloud-based security system can further include receiving an initial blacklist from a node in a cloud-based security system or initializing the initial blacklist; receiving updates related to domains performing fast flux techniques from other nodes in the cloud-based security system; and adding new entries to the blacklist based on the updates with each entry including an aging factor. The method in a cloud-based security system can further include checking and updating existing entries in the blacklist based on associated aging factors.

In another exemplary embodiment, a cloud-based security system includes a plurality of nodes communicatively coupled to one or more users; and a Domain Name System (DNS) service providing a resolution service, proxy, or monitor in the cloud-based security system; wherein the DNS service is configured to receive DNS records with time-to-live (TTL) parameters; check the TTL parameters for indication of a fast flux technique; and detect domains performing the fast flux technique based on the DNS records.

In yet another exemplary embodiment, a node in a cloud-based security system a network interface, a data store, and a processor communicatively coupled to one another; and memory storing computer executable instructions, and in response to execution by the processor, the computer executable instructions cause the processor to perform steps of operate a Domain Name System (DNS) resolution service, proxy, or monitor in the cloud-based security system; receive DNS records with time-to-live (TTL) parameters; check the TTL parameters for indication of a fast flux technique; and detect domains performing the fast flux technique based on the DNS records.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1 is a network diagram of a distributed security system, and the like;

DETAILED DESCRIPTION OF THE DISCLOSURE

In various exemplary embodiments, Zero Day Threat Detection based on Fast Flux detection and aggregation is introduced into a distributed or cloud-based security system. Variously, the Zero Day Threat Detection augments existing threat detection techniques in the cloud-based security system by aggregating and performing fast flux changes in real time.

§1.0 Example High Level System Architecture—Cloud-Based Security System

Figure 1:
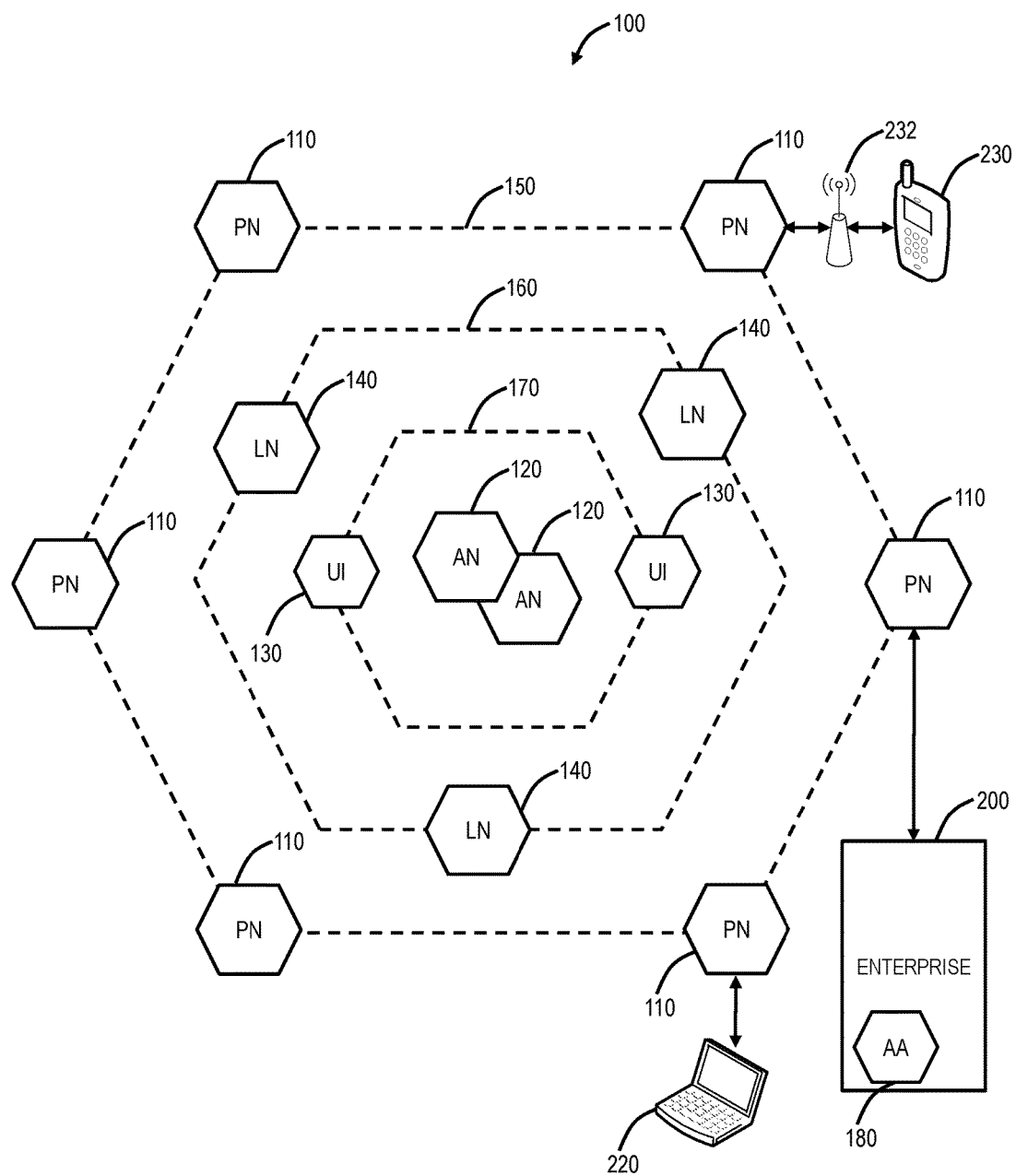

Referring to FIG. 1, in an exemplary embodiment, a block diagram illustrates a distributed security system 100. The system 100 may, for example, be implemented as an overlay network in a wide area network (WAN), such as the Internet, a local area network (LAN), or the like. The system 100 includes content processing nodes (PN) 110, that proactively detect and preclude the distribution of security threats, e.g., malware, spyware, viruses, email spam, etc., and other undesirable content sent from or requested by an external system. The processing nodes 110 can also log activity and enforce policies. Example external systems may include an enterprise 200, a computer device 220, and a mobile device 230, or other network and computing systems communicatively coupled to the system 100. In an exemplary embodiment, each of the processing nodes 110 may include a decision system, e.g., data inspection engines that operate on a content item, e.g., a web page, a file, an email message, or some other data or data communication that is sent from or requested by one of the external systems. In an exemplary embodiment, all data destined for or received from the Internet is processed through one of the processing nodes 110. In another exemplary embodiment, specific data specified by each external system, e.g., only email, only executable files, etc., is process through one of the processing node 110.

Each of the processing nodes 110 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an exemplary embodiment, the threat classification may be reduced to a subset of categories e.g., violating, non-violating, neutral, unknown. Based on the subset classification, the processing node 110 may allow distribution of the content item, preclude distribution of the content item, allow distribution of the content item after a cleaning process, or perform threat detection on the content item. In an exemplary embodiment, the actions taken by one of the processing nodes 110 may be determinative on the threat classification of the content item and on a security policy of the external system to which the content item is being sent from or from which the content item is being requested by. A content item is violating if, for any part C=[c1, c2, . . . , cm] of the content item, at any of the processing nodes 110, any one of the data inspection engines generates an output that results in a classification of "violating."

Figure 3:
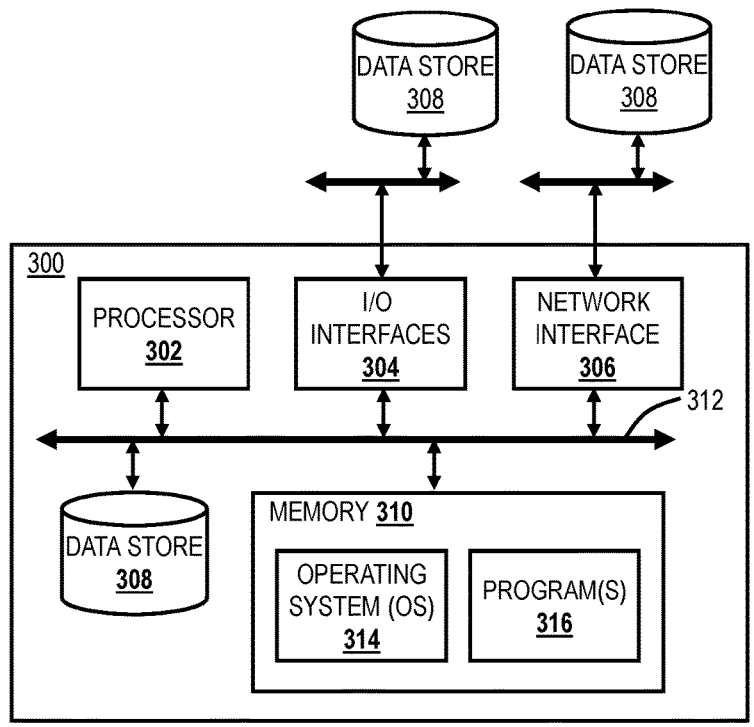
FIG. 3 is a block diagram of a server which may be used in the distributed security system of FIG. 1 or standalone.

Each of the processing nodes 110 may be implemented by one or more of computer and communication devices, e.g., server computers, gateways, switches, etc., such as the server 300 described in FIG. 3. In an exemplary embodiment, the processing nodes 110 may serve as an access layer 150. The access layer 150 may, for example, provide external system access to the security system 100. In an exemplary embodiment, each of the processing nodes 110 may include Internet gateways and one or more servers, and the processing nodes 110 may be distributed through a geographic region, e.g., throughout a country, region, campus, etc. According to a service agreement between a provider of the system 100 and an owner of an external system, the system 100 may thus provide security protection to the external system at any location throughout the geographic region.

Data communications may be monitored by the system 100 in a variety of ways, depending on the size and data requirements of the external system. For example, an enterprise 200 may have multiple routers, switches, etc. that are used to communicate over the Internet, and the routers, switches, etc. may be configured to establish communications through the nearest (in traffic communication time, for example) processing node 110. A mobile device 230 may be configured to communicated to a nearest processing node 110 through any available wireless access device, such as an access point, or a cellular gateway. A single computer device 220, such as a consumer's personal computer, may have its browser and email program configured to access the nearest processing node 110, which, in turn, serves as a proxy for the computer device 220. Alternatively, an Internet provider may have all of its customer traffic processed through the processing nodes 110.

In an exemplary embodiment, the processing nodes 110 may communicate with one or more authority nodes (AN) 120. The authority nodes 120 may store policy data for each external system and may distribute the policy data to each of the processing nodes 110. The policy may, for example, define security policies for a protected system, e.g., security policies for the enterprise 200. Example policy data may define access privileges for users, web sites and/or content that is disallowed, restricted domains, etc. The authority nodes 120 may distribute the policy data to the access nodes 110. In an exemplary embodiment, the authority nodes 120 may also distribute threat data that includes the classifications of content items according to threat classifications, e.g., a list of known viruses, a list of known malware sites, spam email domains, a list of known phishing sites, etc. The distribution of threat data between the processing nodes 110 and the authority nodes 120 may implemented by push and pull distribution schemes described in more detail below. In an exemplary embodiment, each of the authority nodes 120 may be implemented by one or more computer and communication devices, e.g., server computers, gateways, switches, etc., such as the server 300 described in FIG. 3. In some exemplary embodiments, the authority nodes 120 may serve as an application layer 160. The application layer 160 may, for example, manage and provide policy data, threat data, and data inspection engines and dictionaries for the processing nodes 110.

Other application layer functions may also be provided in the application layer 170, such as a user interface (UI) front-end 130. The user interface front-end 130 may provide a user interface through which users of the external systems may provide and define security policies, e.g., whether email traffic is to be monitored, whether certain web sites are to be precluded, etc. Another application capability that may be provided through the user interface front-end 130 is security analysis and log reporting. The underlying data on which the security analysis and log reporting functions operate are stored in logging nodes (LN) 140, which serve as a data logging layer 160. Each of the logging nodes 140 may store data related to security operations and network traffic processed by the processing nodes 110 for each external system. In an exemplary embodiment, the logging node 140 data may be anonymized so that data identifying an enterprise is removed or obfuscated. For example, identifying data may be removed to provide an overall system summary of security processing for all enterprises and users without revealing the identity of any one account. Alternatively, identifying data may be obfuscated, e.g., provide a random account number each time it is accessed, so that an overall system summary of security processing for all enterprises and users may be broken out by accounts without revealing the identity of any one account. In another exemplary embodiment, the identifying data and/or logging node 140 data may be further encrypted, e.g., so that only the enterprise (or user if a single user account) may have access to the logging node 140 data for its account. Other processes of anonymizing, obfuscating, or securing logging node 140 data may also be used.

In an exemplary embodiment, an access agent 180 may be included in the external systems. For example, the access agent 180 is deployed in the enterprise 200. The access agent 180 may, for example, facilitate security processing by providing a hash index of files on a client device to one of the processing nodes 110, or may facilitate authentication functions with one of the processing nodes 110, e.g., by assigning tokens for passwords and sending only the tokens to a processing node so that transmission of passwords beyond the network edge of the enterprise is minimized. Other functions and processes may also be facilitated by the access agent 180. In an exemplary embodiment, the processing node 110 may act as a forward proxy that receives user requests to external servers addressed directly to the processing node 110. In another exemplary embodiment, the processing node 110 may access user requests that are passed through the processing node 110 in a transparent mode. A protected system, e.g., enterprise 200, may, for example, choose one or both of these modes. For example, a browser may be configured either manually or through the access agent 180 to access the processing node 110 in a forward proxy mode. In the forward proxy mode, all accesses are addressed to the processing node 110.

In an exemplary embodiment, an enterprise gateway may be configured so that user requests are routed through the processing node 110 by establishing a communication tunnel between enterprise gateway and the processing node 110. For establishing the tunnel, existing protocols such as generic routing encapsulation (GRE), layer two tunneling protocol (L2TP), or other Internet Protocol (IP) security protocols may be used. In another exemplary embodiment, the processing nodes 110 may be deployed at Internet service provider (ISP) nodes. The ISP nodes may redirect subject traffic to the processing nodes 110 in a transparent proxy mode. Protected systems, such as the enterprise 200, may use a multiprotocol label switching (MPLS) class of service for indicating the subject traffic that is to be redirected. For example, at the within the enterprise the access agent 180 may be configured to perform MPLS labeling. In another transparent proxy mode exemplary embodiment, a protected system, such as the enterprise 200, may identify the processing node 110 as a next hop router for communication with the external servers.

Generally, the distributed security system 100 may generally refer to an exemplary cloud-based security system. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, with no installed client version of an application required. Centralization gives cloud service providers complete control over the versions of the browser-based applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The distributed security system 100 is illustrated herein as one exemplary embodiment of a cloud-based system, and those of ordinary skill in the art will recognize the cloud based mobile device security and policy systems and methods contemplate operation on any cloud based system.

§2.0 Example Detailed System Architecture and Operation

Figure 2:
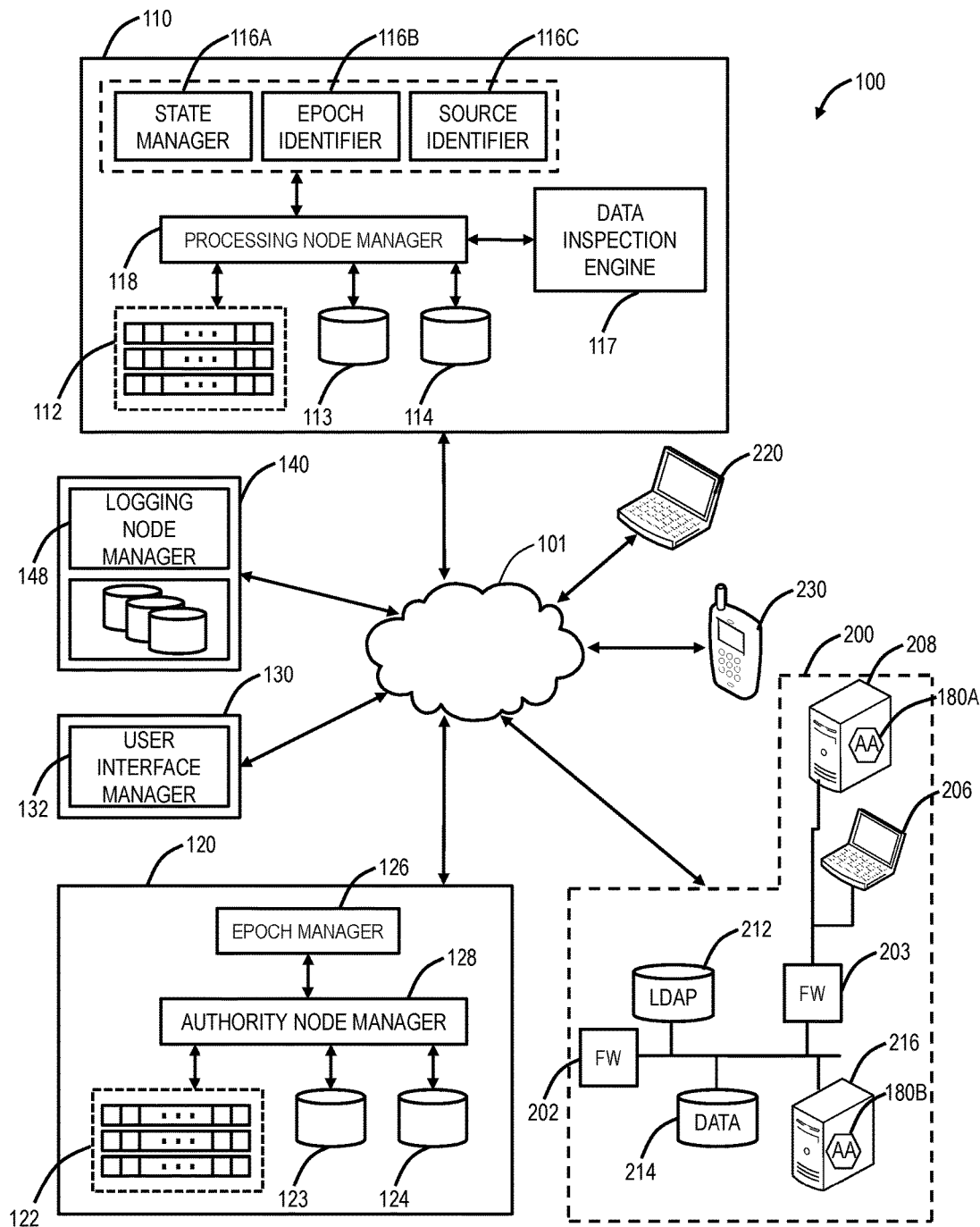
FIG. 2 is a network diagram of the distributed security system of FIG. 1 illustrating various components in more detail.

Referring to FIG. 2, in an exemplary embodiment, a block diagram illustrates various components of the distributed security system 100 in more detail. Although FIG. 2 illustrates only one representative component processing node 110, authority node 120 and logging node 140, those of ordinary skill in the art will appreciate there may be many of each of the component nodes 110, 120 and 140 present in the system 100. A wide area network (WAN) 101, such as the Internet, or some other combination of wired and/or wireless networks, communicatively couples the processing node 110, the authority node 120, and the logging node 140 therebetween. The external systems 200, 220 and 230 likewise communicate over the WAN 101 with each other or other data providers and publishers. Some or all of the data communication of each of the external systems 200, 220 and 230 may be processed through the processing node 110.

FIG. 2 also shows the enterprise 200 in more detail. The enterprise 200 may, for example, include a firewall (FW) 202 protecting an internal network that may include one or more enterprise servers 216, a lightweight directory access protocol (LDAP) server 212, and other data or data stores 214. Another firewall 203 may protect an enterprise subnet that can include user computers 206 and 208 (e.g., laptop and desktop computers). The enterprise 200 may communicate with the WAN 101 through one or more network devices, such as a router, gateway, switch, etc. The LDAP server 212 may store, for example, user login credentials for registered users of the enterprise 200 system. Such credentials may include a user identifiers, login passwords, and a login history associated with each user identifier. The other data stores 214 may include sensitive information, such as bank records, medical records, trade secret information, or any other information warranting protection by one or more security measures.

In an exemplary embodiment, a client access agent 180a may be included on a client computer 208. The client access agent 180a may, for example, facilitate security processing by providing a hash index of files on the user computer 208 to a processing node 110 for malware, virus detection, etc. Other security operations may also be facilitated by the access agent 180a. In another exemplary embodiment, a server access agent 180 may facilitate authentication functions with the processing node 110, e.g., by assigning tokens for passwords and sending only the tokens to the processing node 110 so that transmission of passwords beyond the network edge of the enterprise 200 is minimized. Other functions and processes may also be facilitated by the server access agent 180b. The computer device 220 and the mobile device 230 may also store information warranting security measures, such as personal bank records, medical information, and login information, e.g., login information to the server 206 of the enterprise 200, or to some other secured data provider server. The computer device 220 and the mobile device 230 can also store information warranting security measures, such as personal bank records, medical information, and login information, e.g., login information to a server 216 of the enterprise 200, or to some other secured data provider server.

§2.1 Example Processing Node Architecture

In an exemplary embodiment, the processing nodes 110 are external to network edges of the external systems 200, 220 and 230. Each of the processing nodes 110 stores security policies 113 received from the authority node 120 and monitors content items requested by or sent from the external systems 200, 220 and 230. In an exemplary embodiment, each of the processing nodes 110 may also store a detection process filter 112 and/or threat data 114 to facilitate the decision of whether a content item should be processed for threat detection. A processing node manager 118 may manage each content item in accordance with the security policy data 113, and the detection process filter 112 and/or threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item may be allowed, precluded, or threat detected. In general, content items that are already classified as "clean" or not posing a threat can be allowed, while those classified as "violating" may be precluded. Those content items having an unknown status, e.g., content items that have not been processed by the system 100, may be threat detected to classify the content item according to threat classifications.

The processing node 110 may include a state manager 116A. The state manager 116A may be used to maintain the authentication and the authorization states of users that submit requests to the processing node 110. Maintenance of the states through the state manager 116A may minimize the number of authentication and authorization transactions that are necessary to process a request. The processing node 110 may also include an epoch processor 116B. The epoch processor 116B may be used to analyze authentication data that originated at the authority node 120. The epoch processor 116B may use an epoch ID to further validate the authenticity of authentication data. The processing node 110 may further include a source processor 116C. The source processor 116C may be used to verify the source of authorization and authentication data. The source processor 116C may identify improperly obtained authorization and authentication data, enhancing the security of the network. Collectively, the state manager 116A, the epoch processor 116B, and the source processor 116C operate as data inspection engines.

Because the amount of data being processed by the processing nodes 110 may be substantial, the detection processing filter 112 may be used as the first stage of an information lookup procedure. For example, the detection processing filter 112 may be used as a front end to a looking of the threat data 114. Content items may be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence. Each content item may have an information key that is hashed. For example, the processing node manager 118 may identify the Uniform Resource Locator (URL) address of URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 may improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 thus improves performance of queries where the answer to a request for information is usually positive. Such instances may include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information. In an exemplary embodiment, the detection processing filter 112 may be a Bloom filter implemented by a single hash function. The Bloom filter may be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

§2.2 Example Authority Node Architecture

In general, the authority node 120 includes a data store that stores master security policy data 123 for each of the external systems 200, 220 and 230. An authority node manager 128 may be used to manage the master security policy data 123, e.g., receive input from users of each of the external systems defining different security policies, and may distribute the master security policy data 123 to each of the processing nodes 110. The processing nodes 110 then store a local copy of the security policy data 113. The authority node 120 may also store a master detection process filter 122. The detection processing filter 122 may include data indicating whether content items have been processed by one or more of the data inspection engines 116 in any of the processing nodes 110. The authority node manager 128 may be used to manage the master detection processing filter 122, e.g., receive updates from a processing nodes 110 when the processing node 110 has processed a content item and update the master detection processing filter 122. For example, the master detection processing filter 122 may be distributed to the processing nodes 110, which then store a local copy of the detection processing filter 112.

In an exemplary embodiment, the authority node 120 may include an epoch manager 126. The epoch manager 126 may be used to generate authentication data associated with an epoch ID. The epoch ID of the authentication data is a verifiable attribute of the authentication data that can be used to identify fraudulently created authentication data. In an exemplary embodiment, the detection processing filter 122 may be a guard table. The processing node 110 may, for example, use the information in the local detection processing filter 112 to quickly determine the presence and/or absence of information, e.g., whether a particular URL has been checked for malware; whether a particular executable has been virus scanned, etc. The authority node 120 may also store master threat data 124. The master threat data 124 may classify content items by threat classifications, e.g., a list of known viruses, a list of known malware sites, spam email domains, list of known or detected phishing sites, etc. The authority node manager 128 may be used to manage the master threat data 124, e.g., receive updates from the processing nodes 110 when one of the processing nodes 110 has processed a content item and update the master threat data 124 with any pertinent results. In some implementations, the master threat data 124 may be distributed to the processing nodes 110, which then store a local copy of the threat data 114. In another exemplary embodiment, the authority node 120 may also monitor the health of each of the processing nodes 110, e.g., the resource availability in each of the processing nodes 110, detection of link failures, etc. Based on the observed health of each of the processing nodes 110, the authority node 120 may redirect traffic among the processing nodes 110 and/or balance traffic among the processing nodes 110. Other remedial actions and processes may also be facilitated by the authority node 110.

§2.3 Example Processing Node and Authority Node Communications

The processing node 110 and the authority node 120 may be configured according to one or more push and pull processes to manage content items according to security policy data 113 and/or 123, detection process filters 112 and/or 122, and the threat data 114 and/or 124. In a threat data push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data 114, then the processing node manager 118 may cause one or more of the data inspection engines 117 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120.

The authority node manager 128, in response to receiving the threat data update, updates the master threat data 124 stored in the authority node data store according to the threat data update received from the processing node 110. In an exemplary embodiment, the authority node manager 128 may automatically transmit the updated threat data to the other processing nodes 110. Accordingly, threat data for new threats as the new threats are encountered are automatically distributed to each processing node 110. Upon receiving the new threat data from the authority node 120, each of processing node managers 118 may store the updated threat data in the locally stored threat data 114.

In a threat data pull and push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data, then the processing node manager 118 may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data store. If responsive threat data is stored in the master threat data 124, then the authority node manager 128 provide a reply that includes the responsive threat data to the processing node 110 so that the processing node manager 118 may manage the content item in accordance with the security policy data 112 and the classification of the content item. Conversely, if the authority node manager 128 determines that responsive threat data is not stored in the master threat data 124, then the authority node manager 128 may provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests related to responsive threat data for the content item from other processing nodes 110 can be readily served with responsive threat data.

In a detection process filter and threat data push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 may be implemented to ensure that a false positive has not occurred. The initial check of the detection process filter 112, however, may eliminate many null queries to the threat data 114, which, in turn, conserves system resources and increases efficiency. If the content item is classified by the threat data 114, then the processing node manager 118 may manage the content item in accordance with the security policy data 113 and the classification of the content item. Conversely, if the processing node manager 118 determines that the content item is not classified by the threat data 114, or if the processing node manager 118 initially determines through the detection process filter 112 that the content item is not classified by the threat data 114, then the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to one of the authority nodes 120.

The authority node manager 128, in turn, may update the master threat data 124 and the master detection process filter 122 stored in the authority node data store according to the threat data update received from the processing node 110. In an exemplary embodiment, the authority node manager 128 may automatically transmit the updated threat data and detection processing filter to other processing nodes 110. Accordingly, threat data and the detection processing filter for new threats as the new threats are encountered are automatically distributed to each processing node 110, and each processing node 110 may update its local copy of the detection processing filter 112 and threat data 114.

In a detection process filter and threat data pull and push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 can be implemented to ensure that a false positive has not occurred. The initial check of the detection process filter 112, however, may eliminate many null queries to the threat data 114, which, in turn, conserves system resources and increases efficiency. If the processing node manager 118 determines that the content item has not been processed, it may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data 120 store. If responsive threat data is stored in the master threat data 124, then the authority node manager 128 provides a reply that includes the responsive threat data to the processing node 110 so that the processing node manager 118 can manage the content item in accordance with the security policy data 112 and the classification of the content item, and further update the local detection processing filter 112. Conversely, if the authority node manager 128 determines that responsive threat data is not stored in the master threat data 124, then the authority node manager 128 may provide a reply that does not include the responsive threat data to the processing node 110. In response, the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 may then update the master threat data 124. Thereafter, any future requests for related to responsive threat data for the content item from other processing nodes 110 can be readily served with responsive threat data.

The various push and pull data exchange processes provided above are exemplary processes for which the threat data and/or detection process filters may be updated in the system 100 of FIGS. 1 and 2. Other update processes, however, are contemplated with the present invention. The data inspection engines 116, processing node manager 118, authority node manager 128, user interface manager 132, logging node manager 148, and authority agent 180 may be realized by instructions that upon execution cause one or more processing devices to carry out the processes and functions described above. Such instructions can, for example, include interpreted instructions, such as script instructions, e.g., JavaScript or ECMAScript instructions, or executable code, or other instructions stored in a non-transitory computer readable medium. Other processing architectures can also be used, e.g., a combination of specially designed hardware and software, for example.

§3.0 Exemplary Server Architecture

Referring to FIG. 3, in an exemplary embodiment, a block diagram illustrates a server 300 which may be used in the system 100, in other systems, or standalone. Any of the processing nodes 110, the authority nodes 120, and the logging nodes 140 may be formed through one or more servers 300. Further, the computer device 220, the mobile device 230, the servers 208, 216, etc. may include the server 300 or a similar structure. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the WAN 101, the enterprise 200, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

§4.0 Exemplary Mobile Device Architecture

Figure 4:
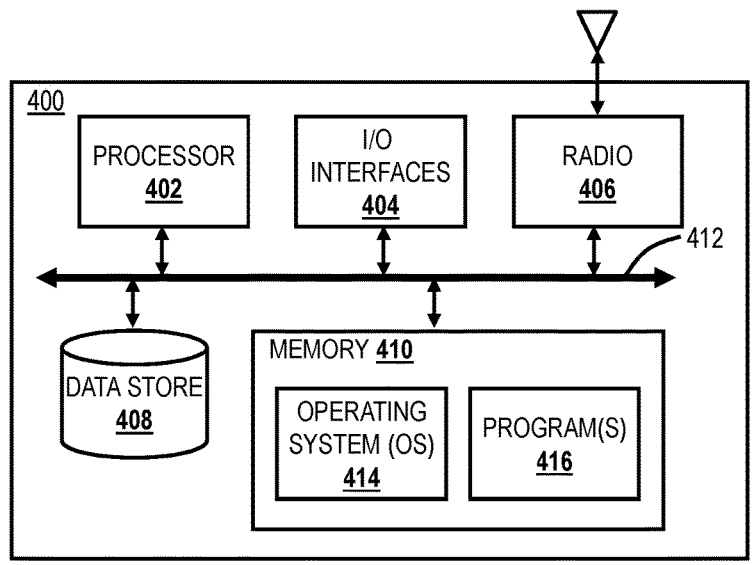
FIG. 4 is a block diagram of a mobile device which may be used in the system of FIG. 1 or with any other cloud-based system.

Referring to FIG. 4, in an exemplary embodiment, a block diagram illustrates a mobile device 400, which may be used in the system 100 or the like. The mobile device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 4 depicts the mobile device 410 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the mobile device 410, a semiconductor-based microprocessor (in the form of a microchip or chip set), or generally any device for executing software instructions. When the mobile device 410 is in operation, the processor 402 is configured to execute software stored within the memory 410, to communicate data to and from the memory 410, and to generally control operations of the mobile device 410 pursuant to the software instructions. In an exemplary embodiment, the processor 402 may include a mobile optimized processor such as optimized for power consumption and mobile applications. The I/O interfaces 404 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the mobile device 410. Additionally, the I/O interfaces 404 may further include an imaging device, i.e. camera, video camera, etc.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 4, the software in the memory 410 includes a suitable operating system (O/S) 414 and programs 416. The operating system 414 essentially controls the execution of other computer programs, and provides scheduling, input-output control, file and data management, memory management, and communication control and related services. The programs 416 may include various applications, add-ons, etc. configured to provide end user functionality with the mobile device 400. For example, exemplary programs 416 may include, but not limited to, a web browser, social networking applications, streaming media applications, games, mapping and location applications, electronic mail applications, financial applications, and the like. In a typical example, the end user typically uses one or more of the programs 416 along with a network such as the system 100.

§5.0 Exemplary General Cloud System

Figure 5:
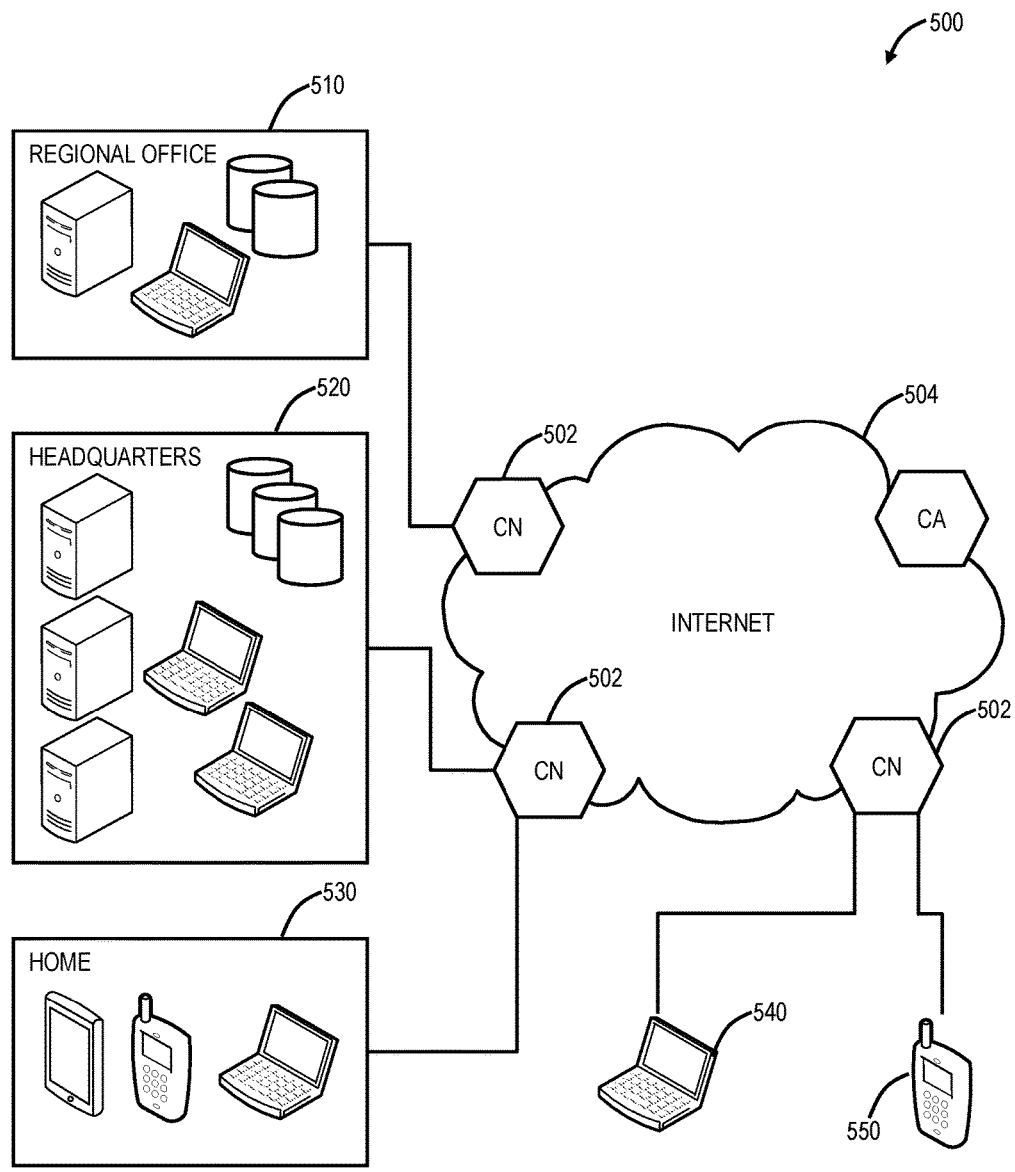
FIG. 5 is a network diagram of a cloud system.

Referring to FIG. 5, in an exemplary embodiment, a cloud system 500 is illustrated for implementing the systems and methods described herein. The cloud system 500 includes one or more cloud nodes (CN) 502 communicatively coupled to the Internet 504. The cloud nodes 502 may include the processing nodes 110, the server 300, or the like. That is, the cloud system 500 may include the distributed security system 100 or another implementation of a cloud based system. In the cloud system 500, traffic from various locations (and various devices located therein) such as a regional office 510, headquarters 520, various employee's homes 530, mobile laptop 540, and mobile device 550 is redirected to the cloud through the cloud nodes 502. That is, each of the locations 510, 520, 530, 540, 550 is communicatively coupled to the Internet 504 through the cloud nodes 502. The cloud system 500 may be configured to perform various functions such as spam filtering, uniform resource locator (URL) filtering, antivirus protection, bandwidth control, data loss prevention, zero day vulnerability protection, web 2.0 features, and the like. In an exemplary embodiment, the cloud system 500 and the distributed security system 100 may be viewed as Security-as-a-Service through the cloud.

In an exemplary embodiment, the cloud system 500 can be configured to provide mobile device security and policy systems and methods. The mobile device 550 may be the mobile device 400, and may include common devices such as smartphones, tablets, netbooks, personal digital assistants, MP3 players, cell phones, e-book readers, and the like. The cloud system 500 is configured to provide security and policy enforcement for devices including the mobile devices 550 in the cloud. Advantageously, the cloud system 500 avoids platform specific security apps on the mobile devices 550, forwards web traffic through the cloud system 500, enables network administrators to define policies in the cloud, and enforces/cleans traffic in the cloud prior to delivery to the mobile devices 550. Further, through the cloud system 500, network administrators may define user centric policies tied to users, not devices, with the policies being applied regardless of the device used by the user. The cloud system 500 provides 24×7 security with no need for updates as the cloud system 500 is always up-to-date with current threats and without requiring device signature updates. Also, the cloud system 500 enables multiple enforcement points, centralized provisioning and logging, automatic traffic routing to a nearest cloud node 502, geographical distribution of the cloud nodes 502, policy shadowing of users which is dynamically available at the cloud nodes, etc.

In various exemplary embodiments, the cloud system 500 and/or the distributed security system 100 can be used to perform DNS surrogation. Specifically, DNS surrogation can be a framework for distributed or cloud-based security/monitoring as is described herein. Endpoint security is no longer effective as deployments move to the cloud with users accessing content from a plurality of devices in an anytime, anywhere connected manner. As such, cloud-based security is the most effective means to ensure network protection where different devices are used to access network resources. Traffic inspection in the distributed security system 100 and the cloud-based system 500 is performed in an in-line manner, i.e. the processing nodes 110 and the cloud nodes 500 are in the data path of connecting users. Another approach can include a passive approach to the data path. DNS is one of the most fundamental IP protocols. With DNS surrogation as a technique, it is proposed to use DNS for dynamic routing of traffic, per user authentication and policy enforcement, and the like.

In conjunction with the cloud system 500 and/or the distributed security system 100, various techniques can be used for monitoring which are described on a sliding scale between always inline to never inline. First, in an always inline manner, all user traffic is between inline proxies such as the processing nodes 110 or the cloud nodes 502 without exception. Here, DNS can be used as a forwarding mechanism to the inline proxies. Second, in a somewhat always inline manner, all user traffic except for certain business partners or third parties is between inline proxies such as the processing nodes 110 or the cloud nodes 502. Third, in an inline manner for most traffic, high bandwidth applications can be configured to bypass the inline proxies such as the processing nodes 110 or the cloud nodes 502. Exemplary high bandwidth applications can include content streaming such as video (e.g., Netflix, Hulu, YouTube, etc.) or audio (e.g., Pandora, etc.). Fourth, in a mixed manner, inline monitoring can be used for "interesting" traffic as determined by security policy with other traffic being direct. Fifth, in an almost never inline manner, simple domain-level URL filtering can be used to determine what is monitored inline. Finally, sixth, in a never inline manner, DNS augmented security can be used.

§6.0 DNS Augmented Security

Figure 6:
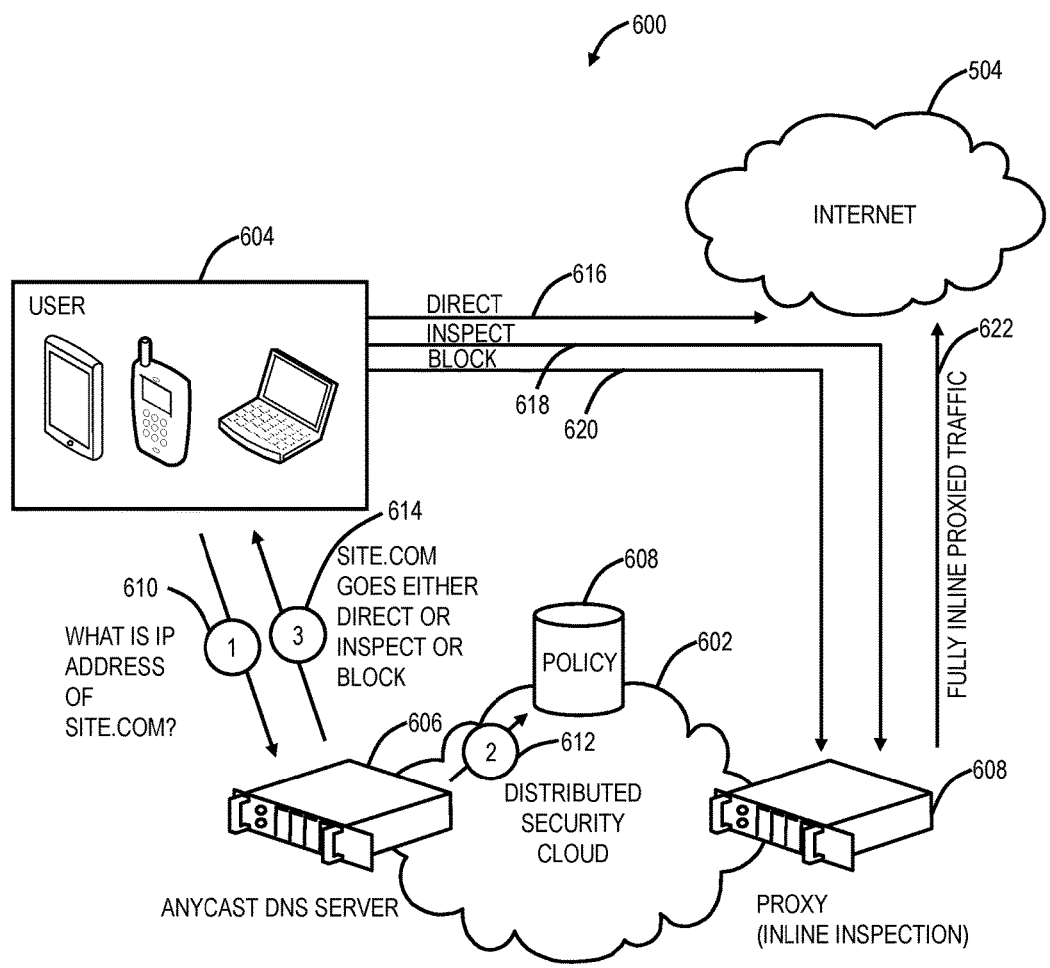
FIG. 6 is a network diagram of a network with a distributed security cloud providing DNS augmented security.

Referring to FIG. 6, in an exemplary embodiment, a network diagram illustrates a network 600 with a distributed security cloud 602 providing DNS augmented security. The network 600 includes a user device 604 connecting to the distributed security cloud 602 via an anycast DNS server 606. The anycast DNS server 606 can be a server such as the server 300 of FIG. 3. Also, the anycast DNS server 606 can be the processing node 110, the cloud node 502, etc. The distributed security cloud 602 includes the anycast DNS server 606, policy data 608, and an inline proxy 610. The inline proxy 610 can include the processing node 110, the cloud node 502, etc. In operation, the user device 604 is configured with a DNS entry of the anycast DNS server 606, and the anycast DNS server 606 can perform DNS surrogation as is described herein. The distributed security cloud 602 utilizes the anycast DNS server 606, the policy data 608, and the inline proxy 610 to perform the DNS augmented security.

The network 600 illustrates the DNS augmented security where DNS information is used as follows. First, at a step 610, the user device 604 requests a DNS lookup of a site, e.g. "what is the IP address of site.com?" from the anycast DNS server 606. The anycast DNS server 606 accesses the policy data 608 to determine the policy associated with the site at step 612. The anycast DNS server 606 returns the IP address of the site based on the appropriate policy at step 614. The policy data 608 determines if the site either goes direct (step 616) to the Internet, is inspected by the inline proxy (step 618), or is blocked per policy (step 620). Here, the anycast DNS server 606 returns the IP address with additional information if the site is inspected or blocked. For example, if the anycast DNS server 606 determines the access is direct, the anycast DNS server 606 simply returns the IP address of the site. If the anycast DNS server 606 determines the site is blocked or inspected, the anycast DNS server 606 returns the IP address to the inline proxy 610 with additional information. The inline proxy 610 can block the site or provide fully inline proxied traffic to the site (step 622) after performing monitoring for security.

The DNS augmented security advantageously is protocol and application agnostic providing visibility and control across virtually all Internet-bound traffic. For example, DNS-based protocols include Internet Relay Chat (IRC), Session Initiation Protocol (SIP), Hypertext Transfer Protocol (HTTP), HTTP Secure (HTTPS), Post Office Protocol v3 (POP3), Internet Message Access Protocol (IMAP), etc. Further, emerging threats are utilizing DNS today especially Botnets and advanced persistent threats (APTs). For example, Fast flux is a DNS technique used to hide phishing and malware delivery sites behind an ever-changing network of compromised hosts acting as proxies. The DNS augmented security provides deployment flexibility when full inline monitoring is not feasible. For example, this can be utilized in highly distributed with high bandwidth environments, in locations with challenging Internet Access, etc. The DNS augmented security can provide URL filtering, white/black list enforcement, etc. for enhanced security without content filtering. In this manner, the network 600 can be used with the distributed security system 100 and the cloud system 500 to provide cloud-based security without requiring full inline connectivity.

§7.0 Fast Flux Detection and Aggregation

Figure 7:
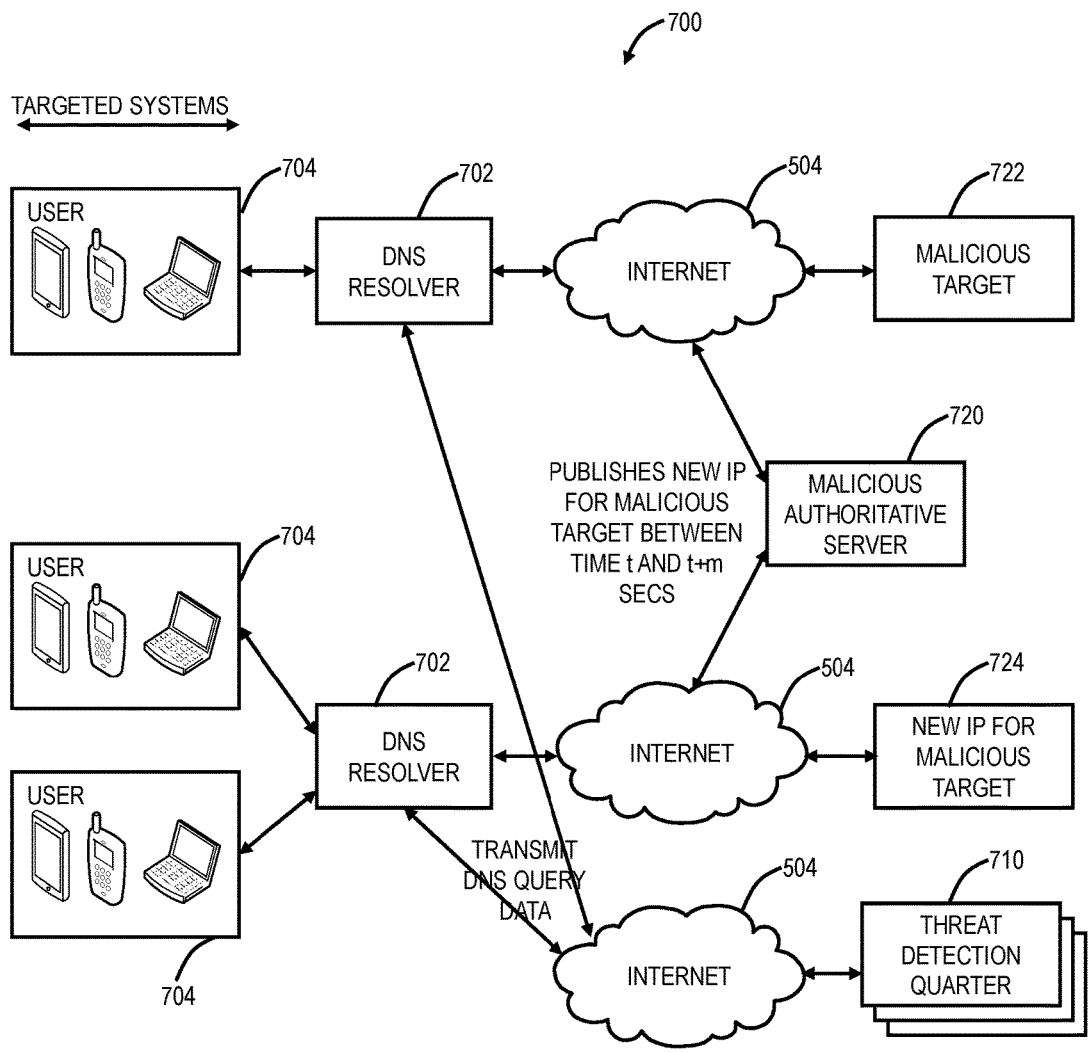
FIG. 7 is a network diagram of a fast flux detection system and aggregation system for use with a cloud-based security system such as the distributed security system of FIG. 1 or the cloud system of FIG. 5.

Referring to FIG. 7, in an exemplary embodiment, a network diagram illustrates a fast flux detection system and aggregation system 700 for use with a cloud-based security system such as the distributed security system 100 or the cloud system 500. The fast flux detection system and aggregation system 700 includes one or more DNS resolvers 702 (or proxies) communicatively coupled to various targeted systems 704, e.g. end users, etc. The DNS resolvers 702 are communicatively coupled to the Internet 504. The DNS resolvers 702 are the client-side of the DNS, and are responsible for initiating and sequencing the queries that ultimately lead to a full resolution (translation) of the resource sought, e.g., translation of a domain name into an IP address. A DNS query may be either a non-recursive query or a recursive query: a non-recursive query is one in which the DNS server provides a record for a domain for which it is authoritative itself, or it provides a partial result without querying other servers; and a recursive query is one for which the DNS server will fully answer the query (or give an error) by querying other name servers as needed. DNS servers are not required to support recursive queries. The DNS resolver 702, or another DNS server acting recursively on behalf of the resolver, negotiates use of recursive service using bits in the query headers. Resolving usually entails iterating through several name servers to find the needed information. However, some resolvers function more simply by communicating only with a single name server. These simple resolvers (called "stub resolvers") rely on a recursive name server to perform the work of finding them.

The DNS resolvers 702 are part of the distributed security system 100 or the cloud system 500. Thus, the DNS resolvers 702 support a large number of users, and thus are ideal to provide zero day threat detection. Specifically, detecting a domain employing a fast flux technique, the distributed security system 100 or the cloud system 500 can immediately update all other nodes with this detection, for blacklisting, and preclude access to the domain. That is, the fast flux detection system and aggregation system 700 can be part of the distributed security system 100 or the cloud system 500 where the fast flux detection system and aggregation system 700 is part of a DNS resolution or proxy service for the users. The fast flux detection system and aggregation system 700 can also be a service running as a distributed cloud accessed via various points of presence (POPs) in the network. The service can also report various statistics to an aggregation service that performs sophisticated analysis such as detecting fast flux or the like based on data analysis.

Specifically, the fast flux detection system and aggregation system 700 can include a threat detection quarter 710 which is communicatively coupled to the DNS resolvers 702. The threat detection quarter 710 is configured to detect domains exhibiting various fast flux techniques. In an exemplary embodiment, a malicious authoritative server 720 is shown in the fast flux detection system and aggregation system 700. The malicious authoritative server 720 is performing a fast flux technique for a domain (with associated malicious target 722). The authoritative server 720 is a name server that gives answers in response to DNS queries asked about names in a domain or zone. An authoritative-only name server returns answers only to queries about domain names that have been specifically configured by the administrator. Name servers can also be configured to give authoritative answers to queries in some zones, while acting as a caching name server for all other zones.

An authoritative name server can either be a primary server (master) or a secondary server (slave). A primary server for a zone is the server that stores the definitive versions of all records in that zone. A secondary server for a zone uses an automatic updating mechanism to maintain an identical copy of the primary server's database for a zone. Examples of such mechanisms include DNS zone transfers and file transfer protocols. DNS provides a mechanism whereby the primary for a zone can notify all the known secondaries for that zone when the contents of the zone have changed. The contents of a zone are either manually configured by an administrator, or managed using Dynamic DNS. Every domain name appears in a zone served by one or more authoritative name servers. The fully qualified domain names of the authoritative name servers of a zone are listed in the NS records of that zone. If the server for a zone is not also authoritative for its parent zone, the server for the parent zone must be configured with a delegation for the zone. When a domain is registered with a domain name registrar, the zone administrator provides the list of name servers (typically at least two, for redundancy) that are authoritative for the zone that contains the domain. The registrar provides the names of these servers to the domain registry for the top level domain containing the zone. The domain registry in turn configures the authoritative name servers for that top level domain with delegations for each server for the zone. If the fully qualified domain name of any name server for a zone appears within that zone, the zone administrator provides IP addresses for that name server, which are installed in the parent zone as glue records; otherwise, the delegation consists of the list of NS records for that zone.

In a single flux, the DNS entries are continuously changed for the malicious target 722 (to a new IP address 724). Double flux has an additional layer of protection by also constantly changing the IP addresses for the malicious authoritative server 720. The threat detection quarter 710 in conjunction with the DNS resolvers 702 are configured to detect domains implementing fast flux techniques. Specifically, the malicious authoritative server 720 (as well as other authoritative servers), responsive to a DNS query for a domain, return either an A record or an AAAA record with a time to live (TTL) parameter. The TTL parameter is used to help the DNS resolvers 702 cache answers locally until they expire to prevent excessive load on the authoritative/resolvers servers for the queried domain. As described herein, a fast flux technique would result in a very small TTL forcing clients to go to different machines and also different subsequent domains based on the nature of the attack. For example, the small TTL can be a time m (e.g., 5 sec., 1 min., etc.). The point of a small TTL is it makes difficult to shut down the systems involved in such an attack.

Let's take a zero day attack use case where a fast flux technique is used to send users to a new fake site www-.paypal.com/=cmd login access. Furthermore let's assume that this site has escaped black list because of the issues described in the preceding section. Each of the DNS resolvers 702 are configured to report any fluctuations in IP addresses for queried domains to the threat detection quarter 710 that is an aggregation system that correlates info from several systems in the cloud such as the other DNS resolvers 702 as well as other nodes in the cloud. By performing sophistication mining, algorithmic analysis is able to alert a possible security incident happening with traffic that flows through the cloud. In an exemplary embodiment, various clients are configured to use the DNS resolvers 702 for DNS processing to leverage data from such queries. In another exemplary embodiment, the cloud systems 100, 500 can utilize a tap mode where an egress proxy or a switch is configured to send a copy of DNS packets traversing the network.

With traditional analysis, it can be very difficult to detect and shut down fast-flux service networks. The detection of domain names being served by a fast-flux service network depends upon multiple analytical passes over DNS query results, with increasing flux detection accuracy gained by employing a scoring mechanism to evaluate multiple relatively short lived DNS records, taking into account including the number of A records returned per query, the number of NS records returned, the diversity of unrelated networks represented and the presence of broadband or dialup networks in every result set. This concept of analyzing short TTLs with the associated scoring of result sets per domain or hostname from multiple successive TTL expiration periods can work in identifying the use of fast-flux service networks. However, the fast flux detection system and aggregation system 700 with the cloud systems 100, 500 has the ability to leverage large scale deployments including thousands or millions of users worldwide concurrently. The data from the multitude of DNS queries can be aggregated, in real-time, by the threat detection quarter 710 and instantly propagated to various nodes in the cloud systems 100, 500 for zero day protection. For example, the threat detection quarter 710 can operate in the authority node 120 in the distributed security system 100 or in one of the cloud nodes 502 in the cloud system 500. Alternatively, the threat detection quarter 710 can be a separate device or operated in a distributed fashion across various nodes in the systems 100, 500.

§8.0 Fast Flux Detection and Aggregation Process

Figure 8:
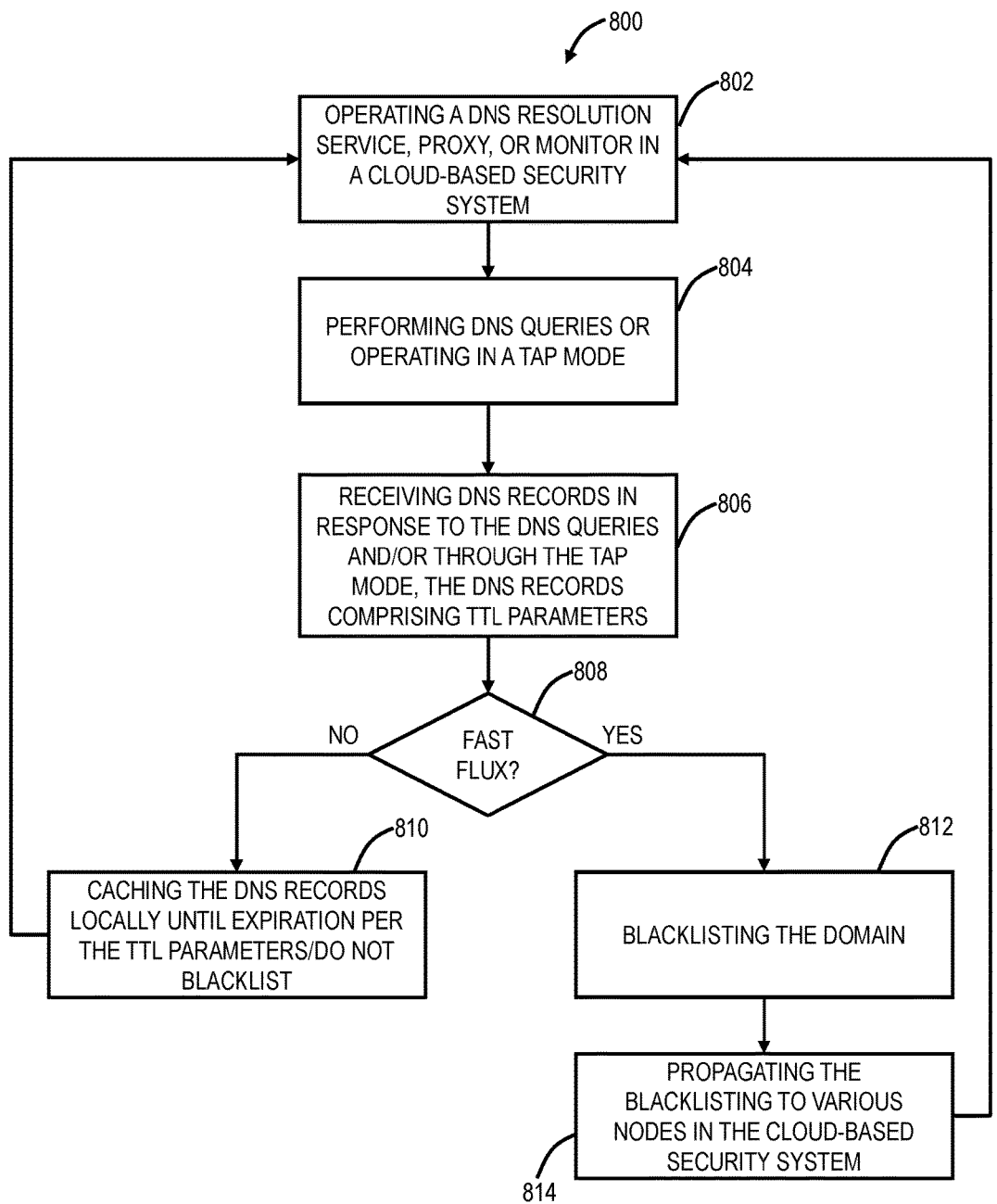
FIG. 8 is a flowchart of a fast flux detection and aggregation process that can be implemented in the fast flux detection system and aggregation system of FIG. 7 with a cloud-based security system such as the distributed security system of FIG. 1 or the cloud system of FIG. 5.

Referring to FIG. 8, in an exemplary embodiment, a flowchart illustrates a fast flux detection and aggregation process 800 that can be implemented in the fast flux detection system and aggregation system 700 with a cloud-based security system such as the distributed security system 100 or the cloud system 500. The fast flux detection and aggregation process 800 includes operating a DNS resolution service, proxy, or monitor in a cloud-based security system (step 802). Note, the DNS resolution service or proxy can perform the DNS queries for clients or monitor DNS queries in a tap mode where an egress proxy or a switch is configured to send a copy of DNS packets traversing the systems 100, 500, 700. The fast flux detection and aggregation process 800 includes performing DNS queries and/or operating in a tap mode (step 804). Specifically, the fast flux detection and aggregation process 800 includes performing DNS queries, monitoring DNS responses, or both.

The fast flux detection and aggregation process 800 includes receiving DNS records in response to the DNS queries or through the tap mode, the DNS records including TTL parameters (step 806). For each DNS response, the fast flux detection and aggregation process 800 includes checking if a TTL parameter of a domain is indicative of a fast flux technique (step 808). The indication could be an extremely short TTL parameter such as 5 sec., 30 sec., etc. This check can also be based on aggregating and maintaining a list for all domains. Some domains can be whitelisted and not checked. This checking can be for domains not on the whitelist. Data analytics can also be utilized and processed over time.

To detect the fast flux technique, the cloud-based security system advantageously has a large, distributed view of ongoing network activity. The cloud-based security system can maintain a list of extremely short TTLs and analyze behavior over time. For example, if a domain or hostname continually has extremely short TTLs, the cloud-based security system can detect the fast flux technique. The cloud-based security system can also use scoring over time with extremely short TTLs being one component, disparate hostnames in successive DNS queries being another, and the like. Other techniques are also contemplated.

If the domain is not indicative of a fast flux technique (step 808), the fast flux detection and aggregation process 800 includes caching the DNS records locally until expiration per the TTL parameters (if operating as the DNS resolver) and not blacklist the domain (step 810). If the domain is indicative of a fast flux technique (step 808), the fast flux detection and aggregation process 800 includes blacklisting the domain (step 812) and propagates the blacklisting to various nodes in the cloud-based security system (step 814). The blacklisting is one exemplary embodiment. In another exemplary embodiment, the fast flux detection and aggregation process 800 includes detecting the fast flux technique and providing a notification of a suspicious event. In yet another exemplary embodiment, the fast flux detection and aggregation process 800 includes identifying end clients that seem to be infected. In yet another exemplary embodiment, the fast flux detection and aggregation process 800 includes generating a list of infected botnets or command centers.

§9.0 Fast Flux Domain Preclusion

Figure 9:
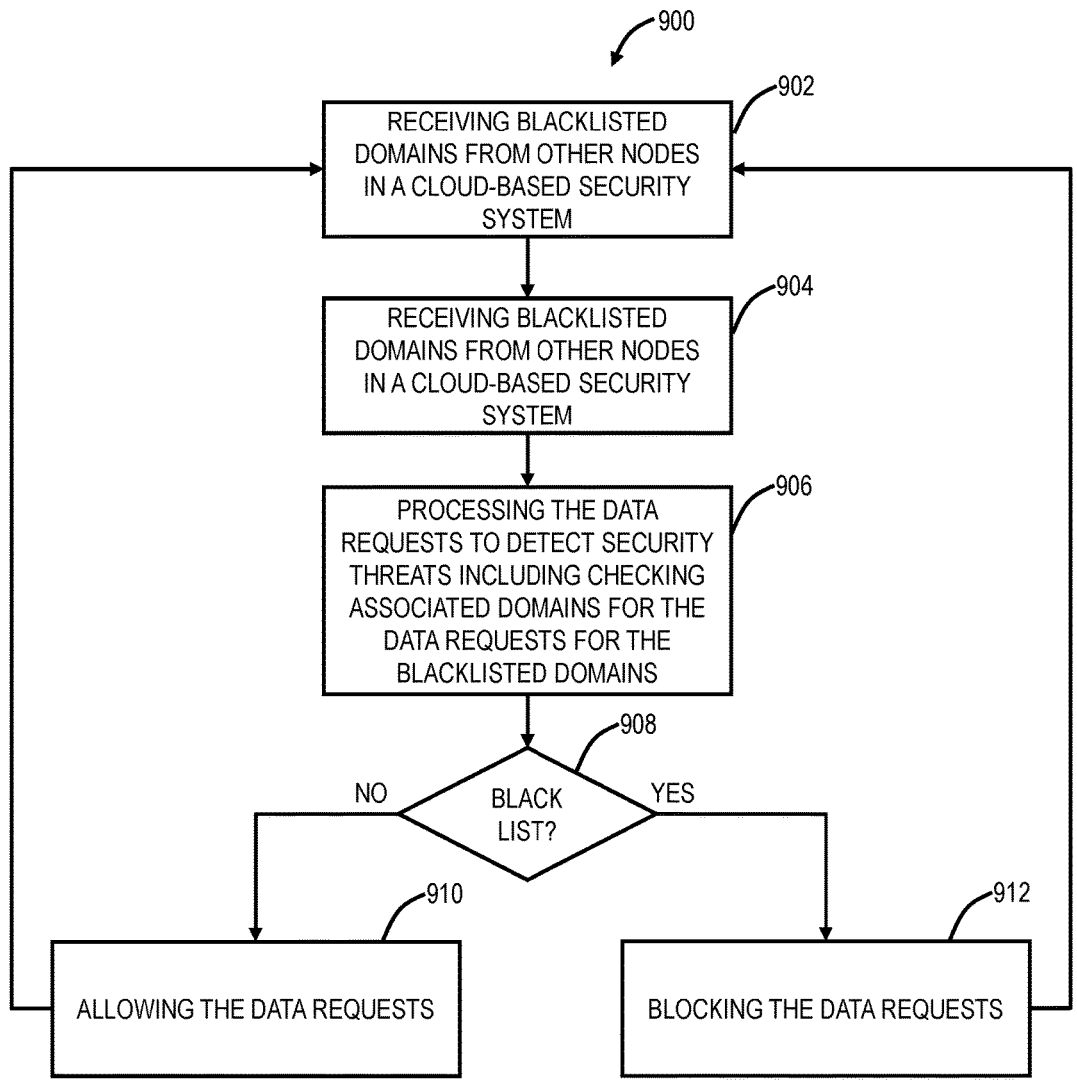
FIG. 9 is a flowchart of a fast flux domain preclusion process that can be implemented in the fast flux detection system and aggregation system of FIG. 7 with a cloud-based security system such as the distributed security system of FIG. 1 or the cloud system of FIG. 5.

Referring to FIG. 9, in an exemplary embodiment, a flowchart illustrates a fast flux domain preclusion process 900 that can be implemented in the fast flux detection system and aggregation system 700 with a cloud-based security system such as the distributed security system 100 or the cloud system 500. Also, the fast flux domain preclusion process 900 can be implemented with the fast flux detection and aggregation process 800. In an exemplary embodiment, the fast flux domain preclusion process 900 contemplates operation in the processing nodes 110 of the distributed security system 100 or the cloud nodes of the cloud system 500. The fast flux domain preclusion process 900 includes receiving blacklisted domains from other nodes in a cloud-based security system (step 902). Here, the processing nodes 110, the could nodes, etc. receive updates for newly detected blacklisted domains, such as based on the fast flux detection and aggregation process 800.

As part of operating as the cloud-based security system, the fast flux domain preclusion process 900 includes receiving data requests from a plurality of users of the cloud-based security system (step 904). The fast flux domain preclusion process 900 includes processing the data requests to detect security threats including checking associated domains for the data requests for the blacklisted domains (step 906). In addition to detecting fast flux domains, the security threats can include malware, spyware, viruses, email spam, etc., and other undesirable content. The fast flux domain preclusion process 900 includes checking if domains on the data requests are on the blacklist (step 908); if not, the fast flux domain preclusion process 900 includes allowing the data requests (step 910); and if so, the fast flux domain preclusion process 900 includes blocking the data requests (step 912).

§10.0 Blacklist Maintenance Process

Figure 10:
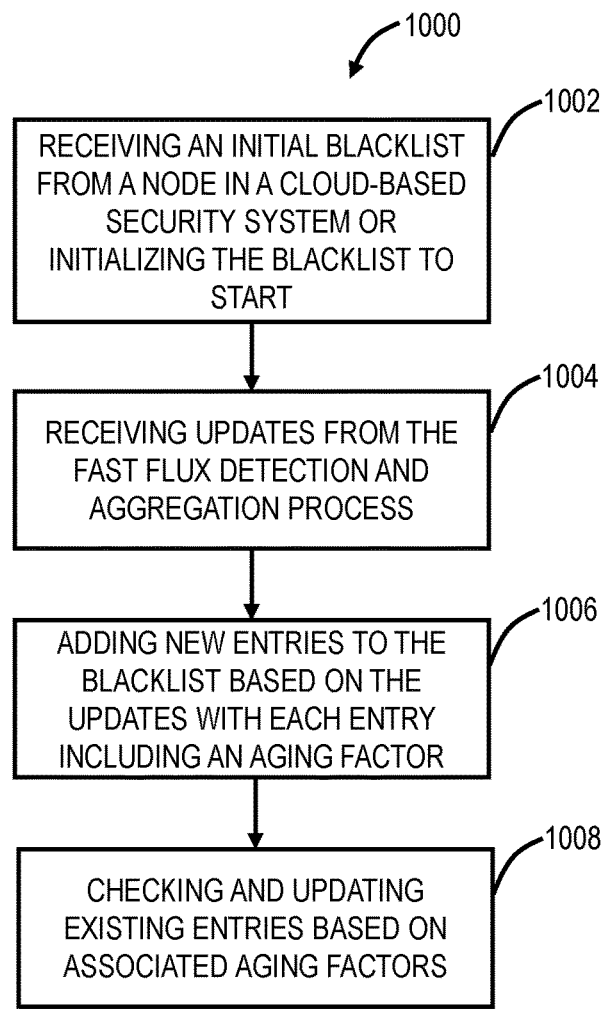
FIG. 10 is a flowchart of a blacklist maintenance process that can be implemented in the fast flux detection system and aggregation system of FIG. 7 with a cloud-based security system such as the of security system of FIG. 1 or the cloud system of FIG. 5

Referring to FIG. 10, in an exemplary embodiment, a flowchart illustrates a blacklist maintenance process 1000 that can be implemented in the fast flux detection system and aggregation system 700 with a cloud-based security system such as the distributed security system 100 or the cloud system 500. Also, the blacklist maintenance process 100 can be implemented with the fast flux detection and aggregation process 800 and the fast flux domain preclusion process 900. The blacklist maintenance process 1000 includes receiving an initial blacklist from a node in a cloud-based security system or initializing the blacklist to start (step 1002). Here, the blacklist can be initialized as empty or an initial list can be sent based on current activity. The blacklist maintenance process 1000 includes receiving updates from the fast flux detection and aggregation process 800 (step 1004). The blacklist maintenance process 1000 includes adding new entries to the blacklist based on the updates with each entry including an aging factor (step 1006). The aging factor is a way to clean domains off the blacklist. For example, suspected domains can be added to the blacklist as well as updated based on each detection. If a domain is not updated, the domain can be removed meaning the domain is no longer implementing a fast flux technique. That is, the blacklist maintenance process 1000 includes checking and updating existing entries based on associated aging factors (step 1008).

§11.0 Client Management Process

Figure 11:
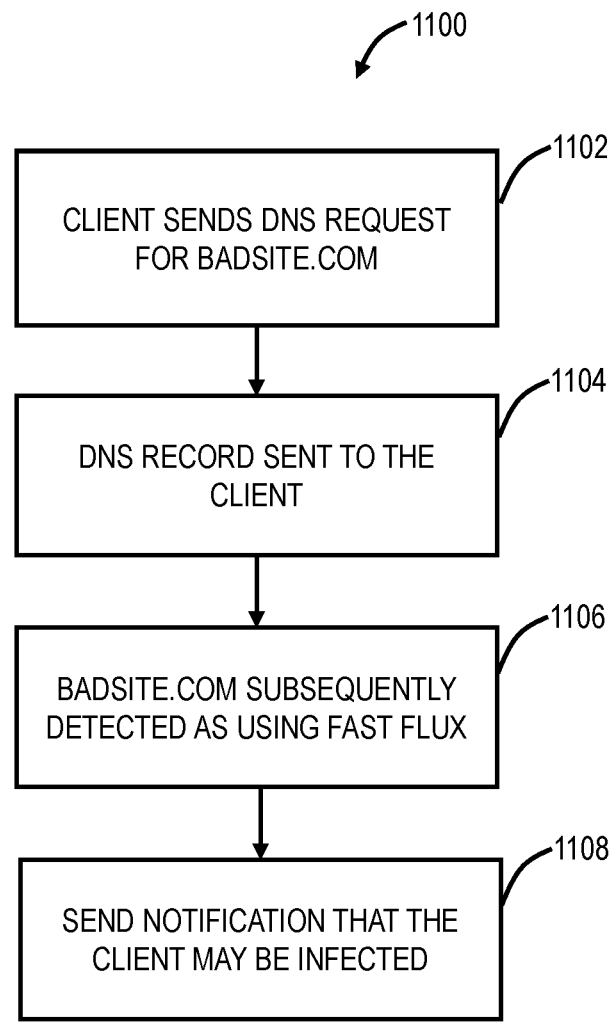
FIG. 11 is a flowchart of a client management process that can be implemented in the fast flux detection system and aggregation system of FIG. 7 with a cloud-based security system such as the distributed security system of FIG. 1 or the cloud system of FIG. 5.

Referring to FIG. 11, in an exemplary embodiment, a flowchart illustrates a client management process 1100 that can be implemented in the fast flux detection system and aggregation system 700 with a cloud-based security system such as the distributed security system 100 or the cloud system 500. The client management process 1100 is illustrated with respect to a single client; of course, there can be a large number of the clients in the fast flux detection system and aggregation system 700. The client management process 1100 includes a client sending a DNS request for an infected site, e.g., "badsite.com" (step 1102). The DNS resolution service, proxy, or monitor in a cloud-based security system receives the DNS request and sends a DNS record to the client (step 1104). For example, assume badsite.com has a DNS of 1.1.1.1 for this request. Now, the client has gone to badsite.com and is potentially infected.

Subsequently, the cloud-based security system detects badsite.com implementing a fast flux technique such as described herein (step 1106). The detection is possible because of the cloud-based security system and how it aggregates information from different distributed DNS nodes into the aggregation cloud layer. Now, the client management process 1100 did not detect badsite.com for the client, but it has a record that the client has visited badsite.com, and can send a notification to a system administrator that the client may be infected (step 1108). Note, the notification can be for all clients in the cloud-based security system who visited the infected site.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A system configured to detect fast flux in a network, the system comprising:
    a network interface communicatively coupled to the network;
    a processor communicatively coupled to the network interface and memory storing instructions that, when executed, cause the processor to
        receive, from a Domain Name System (DNS) resolution service, proxy, or monitor, one or more DNS records with associated time-to-live (TTL) parameters;
        analyze the TTL parameters of the one or more DNS records for an indication of a fast flux technique comprising utilization of numerous Internet Protocol (IP) addresses for a qualified domain name whereby the IP addresses are swapped out due to the TTL parameters in the one or more DNS records; and
        provide a notification instantly to a plurality of nodes responsive to the indication of the fast flux technique to blacklist associated domains by the plurality of nodes for zero day protection from the associated domains.

2. The system of claim 1, wherein the one or more DNS records are analyzed through maintenance of a list of short TTLs and the one or more DNS records in the list are checked over time.

3. The system of claim 1, wherein the indication is based on continual use of extremely short TTLs of less than 30 seconds over time.

4. The system of claim 1, wherein the indication is based on scoring over time based on the TTLs and use of disparate hostnames in successive DNS queries.

5. The system of claim 1, wherein the memory storing instructions that, when executed, further cause the processor to
    maintain a list of domains associated with the one or more DNS records; and
    analyze the TTL parameters of the list of domains for behavior over time to detect the indication.

6. The system of claim 1, wherein the memory storing instructions that, when executed, further cause the processor to add a domain associated with the indication to a blacklist and propagate the addition to a plurality of nodes in a distributed security system.

7. The system of claim 1, wherein the memory storing instructions that, when executed, further cause the processor to
perform data analytics over time on the TTLs and hostnames in the one or more DNS records to detect suspicious behavior for the indication.

8. The system of claim 1, wherein the notification is provided to a cloud-based security system which blacklists a domain associated with the indication.

9. A method for detecting fast flux a network, the method comprising:
receiving, from a Domain Name System (DNS) resolution service, proxy, or monitor, one or more DNS records with associated time-to-live (TTL) parameters;
analyzing the TTL parameters of the one or more DNS records for an indication of a fast flux technique comprising utilization of numerous Internet Protocol (IP) addresses for a qualified domain name whereby the IP addresses are swapped out due to the TTL parameters in the one or more DNS records; and
providing a notification instantly to a plurality of nodes responsive to the indication of the fast flux technique to blacklist associated domains by the plurality of nodes for zero day protection from the associated domains.

10. The method of claim 9, wherein the one or more DNS records are analyzed through maintenance of a list of short TTLs and the one or more DNS records in the list are checked over time.

11. The method of claim 9, wherein the indication is based on continual use of extremely short TTLs of less than seconds over time.

12. The method of claim 9, wherein the indication is based on scoring over time based on the TTLs and use of disparate hostnames in successive DNS queries.

13. The method of claim 9, further comprising:
maintaining a list of domains associated with the one or more DNS records; and
analyzing the TTL parameters of the list of domains for behavior over time to detect the indication.

14. The method of claim 9, further comprising:
adding a domain associated with the indication to a blacklist and propagate the addition to a plurality of nodes in a distributed security system.

15. The method of claim 9, further comprising:
performing data analytics over time on the TTLs and hostnames in the one or more DNS records to detect suspicious behavior for the indication.

16. The method of claim 9, wherein the notification is provided to a cloud-based security system which blacklists a domain associated with the indication.

17. A non-transitory computer readable medium comprising instructions executable by a processor, which in response to such execution causes the processor to perform operations comprising:
receiving, from a Domain Name System (DNS) resolution service, proxy, or monitor, one or more DNS records with associated time-to-live (TTL) parameters;
analyzing the TTL parameters of the one or more DNS records for an indication of a fast flux technique comprising utilization of numerous Internet Protocol (IP) addresses for a qualified domain name whereby the IP addresses are swapped out due to the TTL parameters in the one or more DNS records; and
providing a notification instantly to a plurality of nodes responsive to the indication of the fast flux technique to blacklist associated domains by the plurality of nodes for zero day protection from the associated domains.

18. The non-transitory computer readable medium of claim 17, wherein the one or more DNS records are analyzed through maintenance of a list of short TTLs and the one or more DNS records in the list are checked over time.

19. The non-transitory computer readable medium of claim 17, wherein the indication is based on continual use of extremely short TTLs of less than sec seconds over time.

20. The non-transitory computer readable medium of claim 17, wherein the indication is based on scoring over time based on the TTLs and use of disparate hostnames in successive DNS queries.

* * * * *